(12) United States Patent
Rajasekaran et al.

(10) Patent No.: US 11,776,016 B2
(45) Date of Patent: Oct. 3, 2023

(54) SYSTEMS AND METHODS FOR DETERMINING USER PERSONAS FOR A USER

(71) Applicant: Walmart Apollo, LLC, Bentonville, AR (US)

(72) Inventors: Rishi Rajasekaran, Sunnyvale, CA (US); Sneha Gupta, Santa Clara, CA (US); Yokila Arora, San Jose, CA (US); Rahul Sridhar, Santa Clara, CA (US); Sushant Kumar, San Jose, CA (US); Evren Korpeoglu, San Jose, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/587,485

(22) Filed: Jan. 28, 2022

(65) Prior Publication Data
US 2023/0245174 A1 Aug. 3, 2023

(51) Int. Cl.
*G06Q 30/0251* (2023.01)
(52) U.S. Cl.
CPC ................ *G06Q 30/0269* (2013.01)
(58) Field of Classification Search
CPC ........................................ G06Q 30/0207–0277
USPC ....................................................... 705/14.66
See application file for complete search history.

(56) References Cited

U.S. PATENT DOCUMENTS

| 8,099,434 B2* | 1/2012 | Ramer | G06Q 30/0247 |
| | | | 707/786 |
| 8,229,873 B1* | 7/2012 | Dolan | G06F 21/6218 |
| | | | 706/45 |
| 10,438,246 B1* | 10/2019 | Jakobsson | G06Q 30/0273 |
| 11,127,031 B1 | 9/2021 | Viswanath et al. | |
| 2002/0091568 A1* | 7/2002 | Kraft | G06Q 30/0261 |
| | | | 705/14.58 |
| 2004/0199635 A1* | 10/2004 | Ta | H04W 28/02 |
| | | | 709/226 |
| 2009/0063268 A1* | 3/2009 | Burgess | G06Q 30/0239 |
| | | | 705/14.39 |

(Continued)

OTHER PUBLICATIONS

Ryan McCready, 20+ User Persona Examples, Templates and Tips For Targeted Decision-Making, 2021 (Year: 2021).*

*Primary Examiner* — Tarek Elchanti
(74) *Attorney, Agent, or Firm* — Morgan, Lewis & Bockius LLP; Manita Rawat

(57) ABSTRACT

This application relates to apparatus and methods for automatically determining and providing personalized user personas of a customer for specific platforms (e.g., applications). In some examples, a computing device receives a persona request identifying a user and a platform. In response, the computing device obtains user data associated with the user and a plurality of potential user personas from a database. For each of the plurality of potential user personas, the computing device then determines a combination score for the user based on the user data. The combination score indicates user's affinity to a corresponding potential user persona within the platform. The computing device selects at least one potential user persona of the plurality of potential user personas as a final user persona for the user and the platform based on the corresponding combination score.

20 Claims, 6 Drawing Sheets

(56) References Cited

U.S. PATENT DOCUMENTS

| | | | |
|---|---|---|---|
| 2009/0132373 A1* | 5/2009 | Redlich | G06Q 30/02 707/999.005 |
| 2010/0106606 A1* | 4/2010 | Filice | G06Q 30/0251 705/14.73 |
| 2011/0264519 A1* | 10/2011 | Chan | G06Q 30/0251 705/14.49 |
| 2011/0276408 A1* | 11/2011 | Toole | G06Q 30/0269 705/14.66 |
| 2012/0047014 A1 | 2/2012 | Smadja et al. | |
| 2013/0151334 A1* | 6/2013 | Berkhin | G06Q 30/0275 705/14.52 |
| 2015/0227977 A1* | 8/2015 | Shottan | H04L 67/10 705/14.64 |
| 2017/0024761 A1 | 1/2017 | Ruiz et al. | |
| 2018/0225710 A1* | 8/2018 | Kar | G06Q 30/0254 |
| 2019/0213511 A1* | 7/2019 | Higgins | G06Q 10/067 |
| 2020/0195600 A1* | 6/2020 | Hyman | H04L 67/535 |
| 2021/0125221 A1* | 4/2021 | Duvvuri | G06N 5/003 |
| 2021/0133782 A1* | 5/2021 | Mahajan | G06Q 30/0204 |

* cited by examiner

SYSTEMS AND METHODS FOR DETERMINING USER PERSONAS FOR A USER

TECHNICAL FIELD

The disclosure relates generally to digital recommendations and, more specifically, to electronically determining and providing personalized digital recommendations based on predicted user personas within a specific platform.

BACKGROUND

At least some websites, such as retailer websites (e.g., e-commerce websites), use a variety of platforms (e.g., homepage, emails, advertisement page) to display item recommendations including relevant items (e.g., advertisements) to its customers. For example, a homepage of a retailer's website may display item recommendations, and may further allow a customer to purchase recommended items. The displayed recommendations may be determined by recommendation systems, which may attempt to provide recommendations for items which the customer may be interested in. Retailers often derive the recommendations to display based on the retailer's understanding of the corresponding customers in order to provide recommendations that are relevant to the customer. In this regard, it is important for retailers to understand the different kinds of customer (e.g., user personas) that exist within the retailer's customer base. For example, customers may often be recognized as one or more of, video gamers, new parents, women's fashion shoppers, etc. Items for recommendation are often determined based at least in part on the relevancy of the items to the different kinds of customers. Some retailers provide the same item recommendations to a customer on all different platforms of the retailer without taking into account the different requirements associated with various platforms as well as different browsing and purchasing habits (e.g., personas) adapted by a user when using different platforms. For example, Email and Homepage platforms may require a higher confidence or relevancy of the recommendations to the user than the advertisement page. Similarly, a user may be more prone to purchasing Women's fashion items when recommended via email than when recommended on a homepage of a website. However, some retailers provide the same item recommendations to a user via all different platforms, in a global and static manner. However, presenting items in fixed positions without optimizing for relevancy within specific platforms, as indicated by user's changing personas across platforms, may lead to a decreased customer interaction and/or interest when other items that the user is more likely to purchase within a platform could have been presented in that platform, while another set of items that user is more likely to purchase within another platform could have been presented on the another platform. In this way, in some examples, the recommendation systems may provide recommendations for items that the customer finds irrelevant or is not interested in within platforms that the user is most likely to interact with, losing out on customer engagement that may have occurred with other more relevant items recommended in those platforms. In some examples, the customer may even be embarrassed by a displayed recommendation, and may ultimately lead to decreased customer satisfaction with the retailer's platforms.

As a result, a retailer may lose sales of items to a customer. For example, the customer may not buy the recommended item, such as a presented item when presented in a platform that the user does not use to interact with items from that item category. In addition, the customer may leave the website without having purchased an item that, if shown a recommendation for, the customer would have purchased. In some examples, if a customer perceives a recommendation as irrelevant or embarrassing, the customer may go elsewhere, such as another website, to make purchases. As such, there are opportunities to address item recommendation systems, particularly related to the presentation of items in an optimized manner to maximize relevancy of the recommendations within specific platforms. More accurate user personas for a user for different platforms may increase the user's interest in and interaction with the retailer's platform. Understanding the type of persona that the user identifies with within a specific platform may allow for a more robust and personalized generation of assets and campaigns targeted towards that customer within that platform that streamline the customer's experience with the retailer's platform.

SUMMARY

The embodiments described herein are directed to automatically determining and providing digital, platform-specific, user personas for a user navigating various retailer platforms or applications, for example, on a website. The user personas may be used to further determine item recommendations for a user to be presented on the retailer's platform or application. The embodiments may allow a person, such as a customer, to be presented with user personas or item recommendations determined based on the user personas that may be more likely to interest the customer on a specific platform. For example, the embodiments may allow the person to view recommendations or personas that differ based on the platform (e.g., email, homepage, advertisements, etc.) being used and that the person may be more willing to purchase or interact with on the corresponding platform. In some examples, the embodiments may provide scoring processes that score and/or rank potential user personas for a specific platform based on historical user data, catalog data, and co-purchase data specific to the platform and also across platforms in an efficient and accurate manner to increase user interaction and relevancy of the recommendations within the corresponding platform. The scoring processes may determine the user personas for a platform based on user-persona scores, user-platform scores, and user-persona-platform scores for each potential persona as associated with the corresponding platform personalized to the user. In some examples, the user personas are personalized to each person and each platform or sub-platform, e.g., the order of personas is personalized to each person and platform pair. As a result, the embodiments may allow a retailer to present more user personas and/or item recommendations to each person within each platform in more relevant positions, thereby increasing the potential user interaction with the platform without compromising the probability that the person will purchase the recommended items associated with the determined user personas. In addition, because a person may now spend less time reviewing irrelevant recommendations, the person may have additional time to consider additional items for purchase. Further, instead of randomly choosing items to recommend, recommending relevant items at optimized positions may increase customer interaction with various platforms of the retailer. In addition to or instead of these example advantages, persons of ordinary skill in the art having the benefit of these disclosures would recognize and appreciate other advantages as well.

In accordance with various embodiments, exemplary systems may be implemented in any suitable hardware or hardware and software, such as in any suitable computing device. For example, in some embodiments, a computing device is configured to receive a persona request identifying a user and a platform. In response, the computing device is configured to obtain user data associated with the user and a plurality of potential user personas from a database. The computing device is also configured to determine, for each of the plurality of potential user personas, a combination score for the user based on the user data. The combination score indicates user's affinity to a corresponding potential user persona within the platform. Further, the computing device is configured to select at least one potential user persona of the plurality of potential user personas as a final user persona for the user and the platform based on the corresponding combination score.

In some embodiments, a method is provided that includes receiving a persona request identifying a user and a platform. In response, the method includes obtaining user data associated with the user and a plurality of potential user personas from a database. The method also includes determining, for each of the plurality of potential user personas, a combination score for the user based on the user data. The combination score indicates user's affinity to a corresponding potential user persona within the platform. Further, the method includes selecting at least one potential user persona of the plurality of potential user personas as a final user persona for the user and the platform based on the corresponding combination score.

In yet other embodiments, a non-transitory computer readable medium has instructions stored thereon, where the instructions, when executed by at least one processor, cause a computing device to perform operations that include receiving a persona request identifying a user and a platform. The operations also include obtaining user data associated with the user and a plurality of potential user personas from a database. The operations further include determining, for each of the plurality of potential user personas, a combination score for the user based on the user data. The combination score indicates user's affinity to a corresponding potential user persona within the platform. Further, the operations include selecting at least one potential user persona of the plurality of potential user personas as a final user persona for the user and the platform based on the corresponding combination score.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
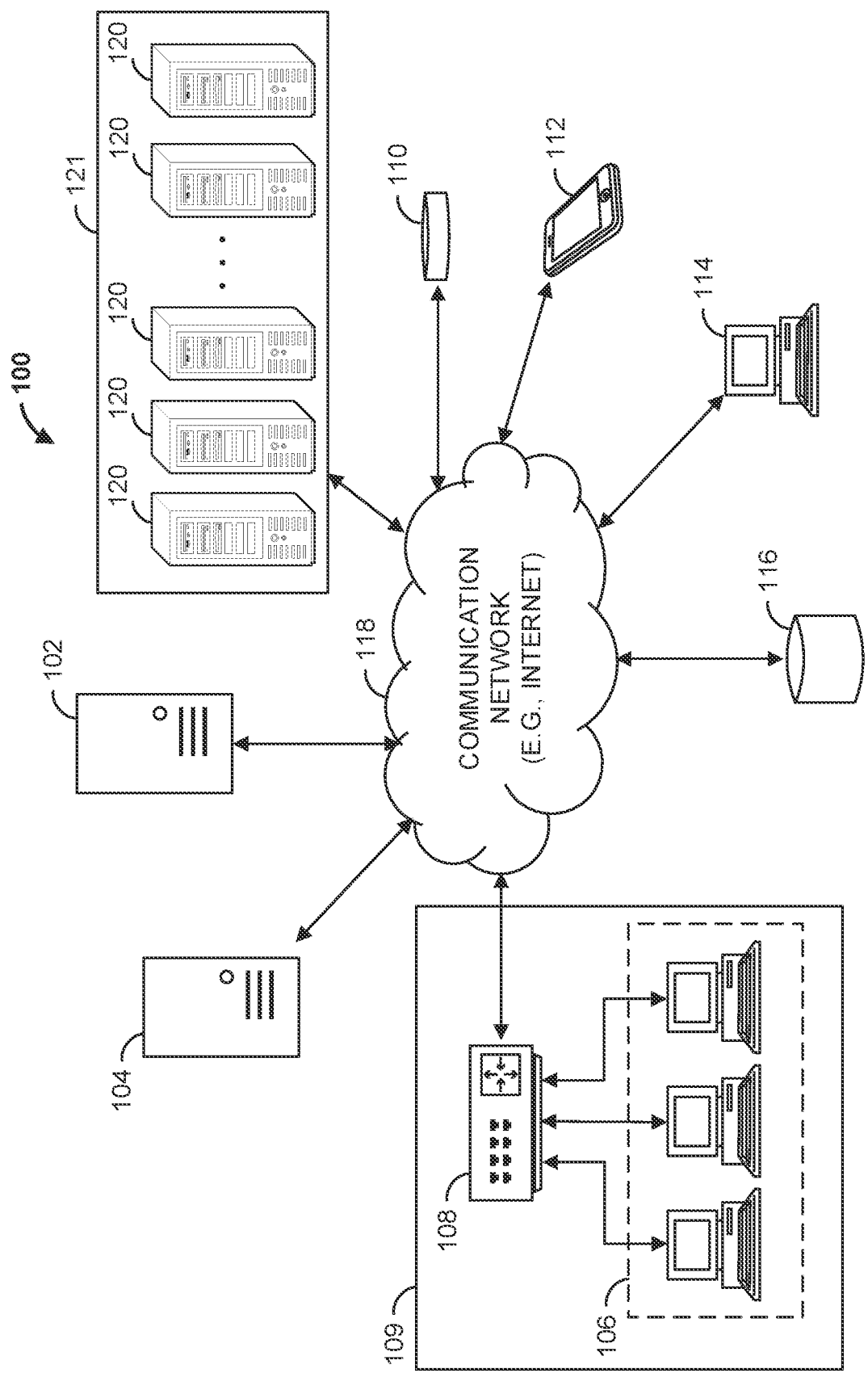
FIG. 1 is a block diagram of a persona system that includes a persona prediction computing device in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a persona system 100 that includes a persona prediction computing device 102 (e.g., a server, such as an application server), a web server 104, one or more processing devices 120, workstation(s) 106, database 116, and one or more customer computing devices 110, 112, 114 operatively coupled over network 118. Persona prediction computing device 102, web server 104, workstation(s) 106, processing device(s) 120, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit and receive data over communication network 118.

In some examples, each of persona prediction computing device 102 and processing device(s) 120 can be a computer, a workstation, a laptop, a server such as a cloud-based server, or any other suitable device. In some examples, each of processing devices 120 is a server that includes one or more processing units, such as one or more graphical processing units (GPUs), one or more central processing units (CPUs), and/or one or more processing cores. Each processing device 120 may, in some examples, execute one or more virtual machines. In some examples, processing resources (e.g., capabilities) of one or more processing devices 120 are offered as a cloud-based service (e.g., cloud computing). For example, cloud-based network 121 may offer computing and storage resources of one or more processing devices 120 to persona prediction computing device 102.

In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, web server 104 hosts one or more retailer websites. In some examples, persona prediction computing device 102, processing devices 120, and/or web server 104 are operated by a retailer, and multiple customer computing devices 112, 114 are operated by customers of the retailer. In some examples, processing devices 120 are operated by a third party (e.g., a cloud-computing provider).

Workstation(s) 106 are operably coupled to communication network 118 via router (or switch) 108. Workstation(s) 106 and/or router 108 may be located at a store 109, for example. Workstation(s) 106 can communicate with persona prediction computing device 102 over communication network 118. The workstation(s) 106 may send data to, and receive data from, persona prediction computing device 102. For example, the workstation(s) 106 may transmit data identifying items purchased by a customer at store 109 to persona prediction computing device 102.

Although FIG. 1 illustrates three customer computing devices 110, 112, 114, persona system 100 can include any number of customer computing devices 110, 112, 114. Similarly, persona system 100 can include any number of persona prediction computing devices 102, processing devices 120, workstations 106, web servers 104, and databases 116.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

First customer computing device 110, second customer computing device 112, and $N^{th}$ customer computing device 114 may communicate with web server 104 over communication network 118. For example, each of multiple computing devices 110, 112, 114 may be operable to view, access, and interact with a website, such as a retailer's website, hosted by web server 104. Web server 104 may transmit user session data related to a customer's activity (e.g., interactions) on the website. For example, a customer may operate one of customer computing devices 110, 112, 114 to initiate a web browser that is directed to the website hosted by web server 104. The customer may, via the web browser, view item recommendations for items displayed on the website, and may click on item advertisements, for example. The website may capture these activities as user session data, and transmit the user session data to persona prediction computing device 102 over communication network 118. The website may also allow the operator to add one or more of the items to an online shopping cart, and allow the customer to perform a "checkout" of the shopping cart to purchase the items. In some examples, web server 104 transmits purchase data identifying items the customer has purchased from the website to persona prediction computing device 102.

In some examples, persona prediction computing device 102 may execute one or more models (e.g., algorithms), such as a machine learning model, statistical model, logarithmic model, language model, etc., to determine user personas to assist in determining items to advertise to the customer (i.e., item recommendations). Persona prediction computing device 102 may transmit the predicted user persona(s) to an item recommendation system which may send item recommendations to web server 104 over communication network 118, and web server 104 may display advertisements for one or more of the recommended items on the website to the customer selected based on the predicted user persona(s). For example, web server 104 may display the item advertisements to the customer on a homepage, a catalog webpage, an item webpage, or a search results webpage of the web site (e.g., as the customer browses those respective webpages).

In some examples, web server 104 transmits a recommendation request (e.g., search request) to persona prediction computing device 102. The recommendation request may identify a recommendation or search query provided by the customer (e.g., via a search bar of the web browser), or a recommendation query provided by a processing unit in response to user adding one or more items to cart or interacting (e.g., engaging) with one or more items. In response to receiving the request, persona prediction computing device 102 may execute the one or more processors to determine user personas indicating user's predicted preferences for types of items to provide as search results or recommendation results to display to the customer (i.e., persona recommendations). In some examples, persona prediction computing device 102 may provide the persona recommendations to another computing device to further use the predicted user persona in determining items to recommend to the user. Persona prediction computing device 102 may transmit the results to web server 104 over communication network 118. Web server 104 may display the results on a results webpage or application (e.g., homepage, email, targeted advertisement page, item carousels, etc.), for example.

Persona prediction computing device 102 is further operable to communicate with database 116 over communication network 118. For example, persona prediction computing device 102 can store data to, and read data from, database 116. Database 116 can be a remote storage device, such as a cloud-based server, a disk (e.g., a hard disk), a memory device on another application server, a networked computer, or any other suitable remote storage. Although shown remote to persona prediction computing device 102, in some examples, database 116 can be a local storage device, such as a hard drive, a non-volatile memory, or a USB stick. Persona prediction computing device 102 may store purchase data received from web server 104 in database 116. Persona prediction computing device 102 may also receive from web server 104 user session data identifying events associated with browsing sessions, and may store the user session data in database 116.

In some examples, persona prediction computing device 102 generates feature vectors for a plurality of models (e.g., machine learning models, statistical models, algorithms, etc.) based on item catalog data, available personas, historical user session data, purchase data, and current user session data for the user and/or items. Persona prediction computing device 102 trains the models based on their corresponding feature vectors, and persona prediction computing device 102 stores the models in a database, such as in database 116 (e.g., cloud storage).

The models, when executed by persona prediction computing device 102, allow persona prediction computing device 102 to determine user persona(s) to further determine one or more items to advertise to a customer. For example, persona prediction computing device 102 may obtain the models from database 116. Persona prediction computing device 102 may then receive, in real-time from web server 104, current user session data identifying real-time events of the customer interacting with a web site (e.g., during a browsing session). In response to receiving the user session data, persona prediction computing device 102 may execute the models to determine user personas predicting user's inclination towards particular facets of products (e.g., auto, beauty, cooking, DIY, Fashion, Home, Interior, Sports, Technology, health, food, essential, grocery, new parents, families, pets, etc.). In some examples, persona prediction computing device 102 may provide the predicted user personas for the user to other processing units to utilize the personas to determine items and/or item categories to recommend (e.g., display) to the customer.

In some examples, persona prediction computing device 102 receives current user session data from web server 104. The user session data may identify actions (e.g., activity) of the customer on a website. For example, the user session data may identify item impressions, item clicks, items added to an online shopping cart, conversions, click-through rates, item recommendations viewed, and/or item recommendations clicked during an ongoing browsing session (e.g., the user data identifies real-time events). Persona prediction computing device 102 may generate user personas based on the user session data, historical user data (e.g., historical user transaction data, historical user engagement data, historical user data associated with a particular retailer platform), personas available, and/or item catalogs. For example, persona prediction computing device 102 may determine relevant personas as an initial matter based on relevance of the corresponding personas to the customer (e.g., based on user session data, historical user data) and catalog data (e.g., item features for items on sale by the retailer). The personas may be ranked based on the customer's affinity towards items associated with the corresponding personas. Persona prediction computing device 102 may then re-rank the user personas based on the customer's affinity towards corresponding retailer platforms (e.g., homepage, search page, advertisement page, email campaigns, personalization page, etc.) and the customer's affinity towards the corresponding personas when using the corresponding retailer platform.

In some examples, the tensors are generated based on semantic similarities between the items, item categories and/or available personas. For example, persona prediction computing device 102 may generate the tensors based on a universal sentence encoding using a semantic similarity model that encodes and embeds item attributes such as title, brand, department, category, etc. (e.g., metadata) of the items and personas as extracted by analyzing the catalogs for each item. For example, persona prediction computing device 102 may generate the tensors based on catalog data for all items as stored in database 116.

In some examples, persona prediction computing device 102 may also generate tensors based on semantic similarities between items. The tensors may be used to rank and score personas based on relevancy to the customer (e.g., based on historical user data, co-purchase date). The initial set of personas may then determine initial affinities and/or ranks for the personas based on the relevancy scores (e.g., user-persona affinity scores).

In some examples, persona prediction computing device 102 may also generate tensors based on semantic similarities between items, specifically for a retailer platform. The tensors may be used to determine user-platform affinity scores (e.g., user-application affinity scores) for a platform (e.g., application) based on historical user data associated with the corresponding platform.

In some examples, persona prediction computing device 102 may also generate tensors based on semantic similarities between items with corresponding personas, specifically for a retailer platform. The tensors may be used to determine user affinity-platform-persona scores (e.g., user-application-persona affinity scores) for a platform (e.g., application) based on historical user data associated with the corresponding platform for a given user and persona combination.

Persona prediction computing device 102 may provide the tensors (e.g., embeddings) as required by each machine learning model. The machine learning models may include, for example, neural networks, deep neural networks, decision tree models, regression models, random forest models, statistical models, stochastic models, or any other suitable models.

Persona prediction computing device 102 assigns the models (or parts thereof) for execution to one or more processing devices 120. For example, each model may be assigned to a virtual machine hosted by a processing device 120. The virtual machine may cause the models or parts thereof to execute on one or more processing units such as GPUs. In some examples, the virtual machines assign each model (or part thereof) among a plurality of processing units.

Based on the output of the models, persona prediction computing device 102 may determine user persona(s) that are relevant to the customer, which may in turn be used to determine items, item categories, etc. to be advertised to the customer on the website using different platforms. For example, persona prediction computing device 102 may transmit the user personas to web server 104, and web server 104 may determine items to recommend based on the user personas to display to the customer.

In some examples, persona prediction computing device 102 may rank personas for specific platforms based on user affinity towards the personas, towards the platforms, and towards the combination of personas and platforms. The personas may be scored and/or ranked based on aggregating the affinities for a customer. In some examples, the three affinities may be weighted for the aggregation. The persona(s) with the highest scores may be determined to be the user personas for the customer to be used by other applications and/or processing units to perform further processing and actions (e.g., determining items for recommendation to the customer on a specific platform).

Persona prediction computing device 102 may also obtain user data from database 116. User data may include historical user purchase data (e.g., transaction data) and historical user session data (e.g., user engagement data). Each element of user data may also be associated with a corresponding platform used by the customer to generate the element of user data. Persona prediction computing device 102 may also obtain catalog data from database 116. The catalog data may include information regarding all items for sale by the retailer. Each item may also be associated with an item category, and an item description.

Persona prediction computing device 102 may extract user features from the user data and item features from the catalog data. For example, persona prediction computing device 102 may extract item features such as, but not limited to, title, description, brand, and product type (e.g., category), for each item from the catalog data. Persona prediction computing device 102 may extract user engagement data for the customer from user data, including, but not limited to, historical transactions, add to carts, item views, searches, clicks, impressions, and browsing data. In some examples, persona prediction computing device 102 may also extract co-purchase data for items purchased together by customers across all customers of the retailer from the user data associated with all customers and/or catalog data. In some examples, persona prediction computing device 102 may also extract user-platform engagement data, such as, but not limited to, add to carts, clicks, impressions, transaction, from historical user data for each retailer platform. In some examples, persona prediction computing device 102 may also extract user-persona engagement data across platforms, such as, but not limited to, add to carts, clicks, impressions, transaction, from historical user data.

Persona prediction computing device 102 may determine, for each platform, a user-platform score indicating a probability of the customer to interact with the platform based on the user-platform engagement data. Persona prediction computing device 102 may generate a machine learning model to determine the user-application score for each of the platforms for the customer. For example, user-platform engagement data may be modeled as a beta distribution with the following parameters:

$$\alpha=(\alpha_1,\alpha_2,\ldots,\alpha_A) \text{ and } \beta=(\beta_1,\beta_2,\ldots,\beta_A) \quad \text{eq. 1}$$

where A indicates the platform, $\alpha$ indicates a number of add to carts and clicks by customer within the corresponding platform determined based on the user-platform engagement data, $\beta$ indicates a number of impressions (but not add to carts or clicks) by the customer within the corresponding platform determined based on the user-platform engagement data, and the platforms are denoted by $\{1, 2, 3, \ldots, A\}$. A probability of user interacting or engaging with an platform a may then be determined as follows:

$$P(\theta_a) = \frac{\Gamma(\alpha_a + \beta_a)}{\Gamma(\alpha_a)\Gamma(\beta_a)} \theta_a^{\alpha_a - 1}(1 - \theta_a)^{\beta_a - 1} \quad \text{eq. 2}$$

The user-platform score, $\lambda_{ua}$, may then be determined, in real-time, based on the beta-distribution of the user-engagement data for the corresponding platform, as follows:

$$\lambda_{ua} = \frac{\alpha_a}{\alpha_a + \beta_a} \quad \text{eq. 3}$$

In some examples, persona prediction computing device 102 may update the beta distribution (e.g., posterior distribution) of the user-engagement data from a corresponding platform as more user session data is received over time using a Bayes' rule. For example, the beta distribution for each platform may be modeled as follows for every new received engagement data associated with the customer:

$$(\alpha_a, \beta_a) \leftarrow \begin{cases} (\alpha_a + 1, \beta_a), & ATC \text{ or click} \\ (\alpha_a, \beta_a + 1), & \text{Impression but neither } ATC \text{ nor click} \\ (\alpha_a, \beta_a), & \text{No interaction} \end{cases} \quad \text{eq. 4}$$

User-platform scores may be determined for a customer in this manner. In some example, for user with no prior engagement with a platform, global user-platform scores may be determined based on user-platform engagement data associated with all customers of the retailer.

Persona prediction computing device 102 may determine for each potential persona (e.g., available persona), a user-persona score for the customer indicating a probability of the customer interacting with the corresponding persona (e.g., affinity between the customer and the corresponding persona) based on the item features, the user engagement data, the co-purchase data, and user-persona engagement data across platforms. A machine learning model (E.g., a deep neural network) may be trained to determine the user-persona score, $\gamma_{up}$, for each potential persona based on user-persona engagement data, user engagement data, and the catalog data. In some examples, persona prediction computing device may generate persona labeling as a multi-label classification problem, where for an input includes input features X indicating a customer and a plurality of items interacted with by the customer, the model generates output labels, $P_1, P_2, \ldots, P_m$, for each customer for the potential personas $\{1, 2, \ldots, m\}$ and their corresponding user-persona scores, $\{\gamma_{u1}, \gamma_{u2}, \ldots, \gamma_{um}\}$.

In some examples, persona prediction computing device 102 may generate, for each platform, a user-platform-persona score based on the persona allocated to the corresponding platforms. Embeddings may be encoded with features related to the customer, platform, and the persona in a vector space. For example, examples of embeddings of customer, platform and persona are as follows:

[Email, female beauty products]→[Email, persona: Beauty-Female]

[Email, baby products]→[Email, persona: New Parents]

where email is a platform and Beauty-Female and New Parents are personas determined for the customer based on historical purchases of items in the category female beauty products and baby products of the customer in the platform, email. Further, the platform embeddings may be further delineated to account for features for items included for the platforms as well as module placement. For example, examples of embeddings including module places are as follows:

[Homepage, Module 1, beauty products, . . . ]→[Homepage, persona: Beauty-Female]

[Homepage, Module 2, beauty products, . . . ]→[Homepage, persona: Beauty-Female]

[Homepage, Module 3, beauty products, . . . ]→[Homepage, persona: Beauty-Female]

where the platform, Homepage, is embedded with the module placements (e.g., sub-platform), module 1, module 2, and module 3, and persona Beauty-female for three different sub-platforms (e.g., module placements) for generating the user-platform-persona scores for each platform and sub-platform.

Persona prediction computing device 102 may determine the user-platform-persona score for each platform (and/or sub platform) for each persona for the customer. For example, for a user u and platform a, if there are m sub-platforms belonging to persona p, then the following applies:

$c_i$: sub-platform embeddings, where $i \in \{1, \ldots, m\}$ $u$: User embedding $m$: Number of campaigns belonging to persona $p$     eq. 5

Any known sentence encoding model, such as Google Universal Sentence Encoder, may be used to encode $c_i$ by taking into consideration all features (e.g., module placement, recommended items, etc.). User-platform-persona score may then be determined by aggregating all sub-platform embeddings belonging to the corresponding persona. For example, the user-platform-persona score $\pi_{uap}$ for platform a may be determined by averaging the inner product of the sub-platform embeddings with user embeddings for all the sub-platforms of the platform, along with user data associated with the customer, platform, and persona, as follows:

$$\pi_{uap} = \frac{1}{m}\sum_{i=1}^{m}(c_i \cdot u + f(u, a, c_i)) \quad \text{eq. 6}$$

where $f(u, a, c_i)$ is the user data associated with the sub-platform $c_i$ for platform a.

Further, persona prediction computing device 102 may determine a final score for each of the personas based on the corresponding platforms that may then be used to rank the personas for each platform for the customer. The user-persona score, user-platform score, and the user-platform-persona score may be aggregated to determine the final scores for each of the personas based on the corresponding platforms. For example, a weighted sum of the three score may be used to determine the final user-persona affinity score based on a platform, $\zeta_{uap}$, as follows:

$$\zeta_{uap} = w_1\lambda_{ua} + w_2\gamma_{up} + w_3\pi_{uap} \quad \text{eq. 6}$$

where weights $w_j$ may be predetermined or tunable based on each use case.

Persona prediction computing device 102 may then select the combination with the highest score or ranked persona(s) as user personas to present to the user within corresponding platforms. Persona prediction computing device 102 may provide to the web server 104 the user personas in the corresponding platforms. Web server 104 may the present the user personas and/or items for recommendation selected based at least in part on the user personas to the user within the corresponding platforms and/or sub-platforms. In this way, persona prediction computing device 102 may generate personalized and robust user personas that are versatile to different platforms, based on user behavior and engagement with specific platforms, as well as user demographics. Further, persona prediction computing device 102 may generate user personas that are robust to change in structure of data, such as addition of new items, new platforms, new module placements, new schemas, as well as new user data. In this way, persona prediction computing device 102 may robustly and accurately determine user personas for a customer for different platforms in a computationally efficient manner by reducing the number of permutations required to generate the personas, and in turn saving computational power required to generate user personas for a variety of platforms.

In some examples, persona prediction computing device 102 may update user-platform data for a user when additional user transactions or addition user engagement is received, via the web server 104, and associated with the customer. For example, upon a user engaging with the generated user personas and/or item recommendations associated with the generated user personas on the corresponding platform(s), persona prediction computing device 102 may update user data associated with the platform to include the additional user transactions and/or additional user engagement. In response to the updated user data, persona prediction computing device 102 may update each of the user-persona scores, user-platform scores, and the user-platform-persona scores based on the additional user transaction and user engagement received. Further, persona prediction computing device 102 may update the final scores for the user personas for the corresponding platform(s) based on the updated data. Persona prediction computing device 102 may then select the combination with the highest updated scores as updated user personas to present to the user within the corresponding platform(s). In this way, persona prediction computing device 102 may generate personalized and robust user personas that are readily updatable in real-time or near real-time based on changing behavior and engagement of the customer within a corresponding platform(s) and feedback, as perceived, from the customer interactions with the previously generated user personas.

Among other advantages, the embodiments allow for real-time inferencing of multiple models to generate user persons for a particular customer personalized for particular platforms of the retailer based on relevancy of the personas to the customer, the relevancy of the platform to the customer, and relevancy of the personas to the customer within the particular platform. Distributing processing tasks prior to the current session, based on previously trained and saved embeddings, allows for more consistent throughput, as well as a reduction in overall processing time. Moreover, the distribution of processing tasks allows for the use of more computationally intensive models, such as neural networks, which can capture non-linear relationships from trained data and may be better suited to estimate relationships on unseen data (e.g., real-time data).

Figure 2:
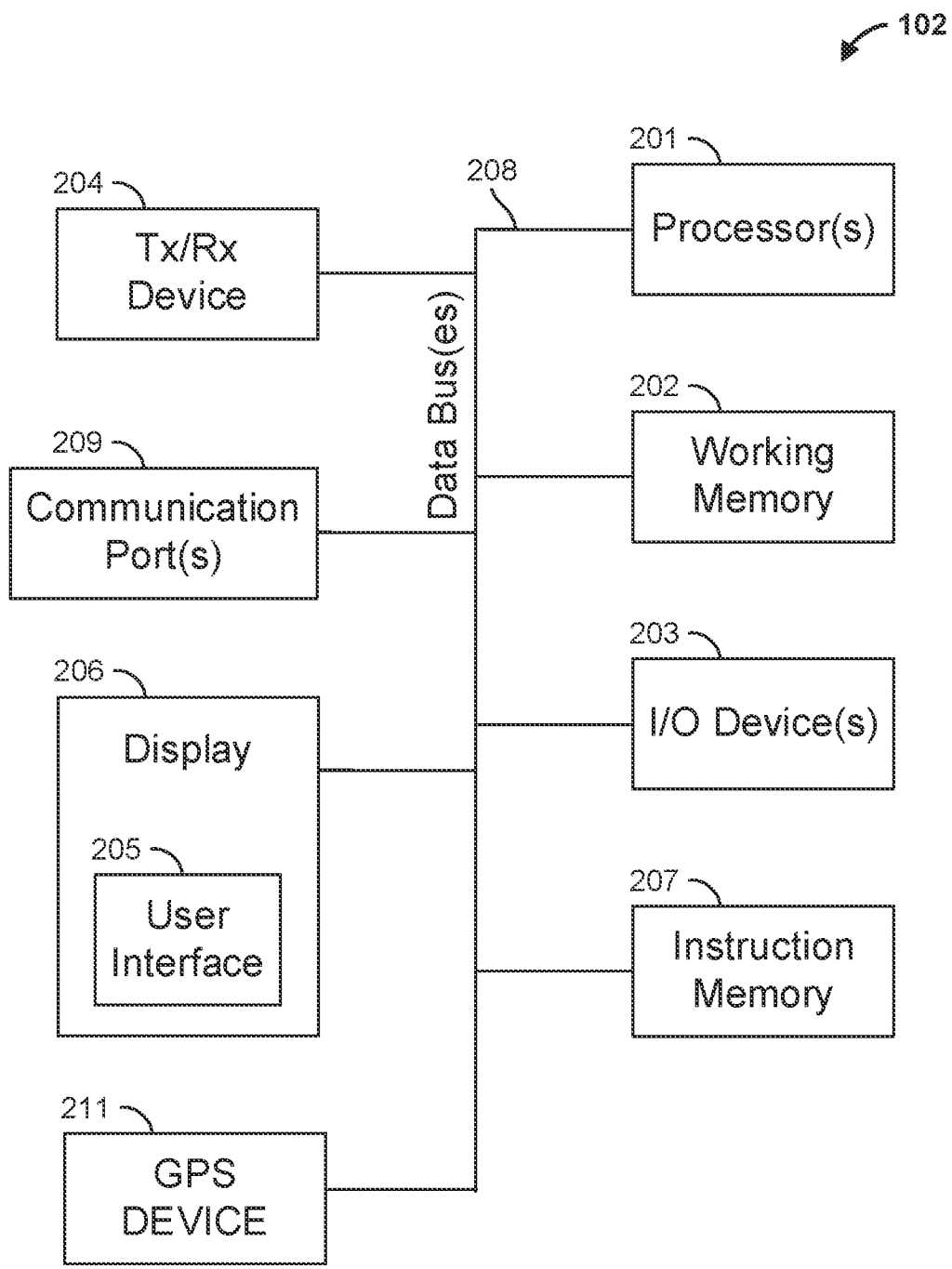
FIG. 2 is a block diagram of the persona prediction computing device of FIG. 1 in accordance with some embodiments.

FIG. 2 illustrates the persona prediction computing device 102 of FIG. 1. Persona prediction computing device 102 can include one or more processors 201, working memory 202, one or more input/output devices 203, instruction memory 207, a transceiver 204, one or more communication ports 209, a display 206 with a user interface 205, and a global positioning system (GPS) device 211, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. Processors 201 can be configured to perform a certain function or operation by executing code, stored on instruction memory 207, embodying the function or operation. For example, processors 201 can be configured to execute code stored in instruction memory 207 to perform one or more of any function, method, or operation disclosed herein.

Additionally, processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of persona prediction computing device 102. Working memory 202 can be a random-access memory (RAM) such as a static random-access memory (SRAM) or dynamic random-access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning model training data.

Display 206 can be any suitable display, and may display user interface 205. User interfaces 205 can enable user interaction with persona prediction computing device 102. For example, user interface 205 can be a user interface for an application of a retailer that allows a customer to view and interact with a retailer's website. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 persona prediction computing device 102 will be operating in. Processor(s) 201 is operable to receive data from, or send data to, a network, such as communication network 118 of FIG. 1, via transceiver 204.

GPS device 211 may be communicatively coupled to the GPS and operable to receive position data from the GPS. For example, GPS device 211 may receive position data identifying a latitude, and longitude, from a satellite of the GPS. Based on the position data, persona prediction computing device 102 may determine a local geographical area (e.g., town, city, state, etc.) of its position. Based on the geographical area, persona prediction computing device 102 may determine relevant trend data (e.g., trend data identifying events in the geographical area).

Figure 3:
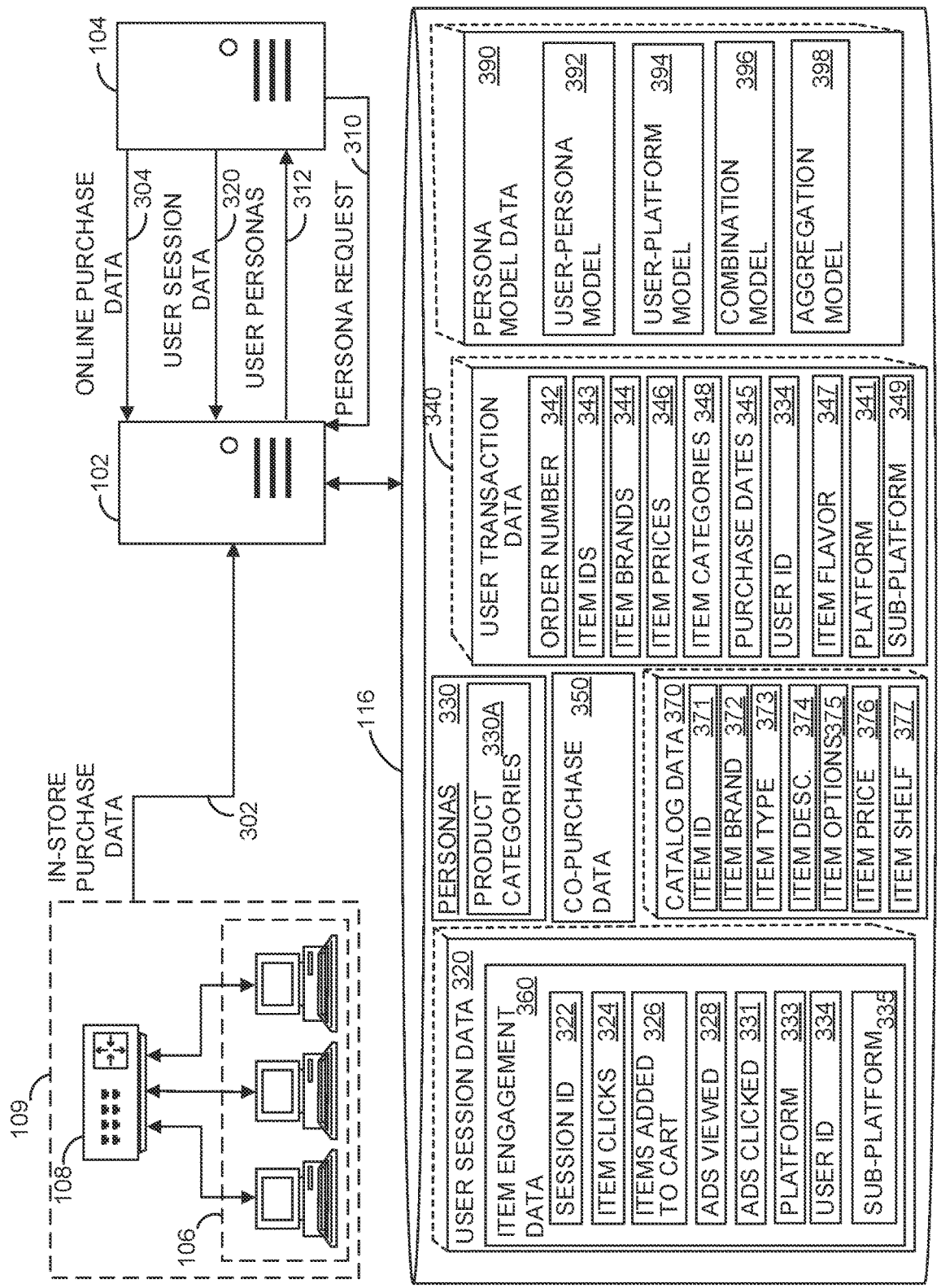
FIG. 3 is a block diagram illustrating various portions of the persona system of FIG. 1 in accordance with some embodiments.

FIG. 3 is a block diagram illustrating examples of various portions of the persona system 100 of FIG. 1. As indicated in the figure, persona prediction computing device 102 may receive user session data 320 from web server 104, and store user session data 320 in database 116. User session data 320 may identify, for each user (e.g., customer), data related to that user's browsing session, such as when browsing a retailer's webpage hosted by web server 104.

In this example, user session data 320 may include item engagement data 360. Item engagement data 360 may include one or more of a session ID 322 (i.e., a website browsing session identifier), item clicks 324 identifying items which the user clicked (e.g., images of items for purchase, keywords to filter reviews for an item), items added-to-cart 326 identifying items added to the user's online shopping cart, advertisements viewed 328 identifying advertisements the user viewed during the browsing session, advertisements clicked 331 identifying advertisements the user clicked on, platform 333 identifying the platform used by the user, sub-platform 335 identifying the sub-platform that the user interacted with, and user ID 334 (e.g., a customer ID, retailer website login ID, a cookie ID, etc.).

Persona prediction computing device 102 may also receive online purchase data 304 from web server 104, which identifies and characterizes one or more online purchases, such as purchases made by the user via a retailer's website hosted by web server 104. Persona prediction computing device 102 may also receive in-store purchase data 302 from store 109, which identifies and characterizes one or more in-store purchases including item identifiers and prices.

Persona prediction computing device 102 may parse in-store purchase data 302 and online purchase data 304 to generate user transaction data 340. In this example, user transaction data 340 may include, for each purchase, one or more of an order number 342 identifying a purchase order, item IDs 343 identifying one or more items purchased in the purchase order, item brands 344 identifying a brand for each item purchased, item prices 346 identifying the price of each item purchased, item types 348 identifying a type (e.g., category) of each item purchased, a purchase date 345 identifying the purchase date of the purchase order, a platform 341, a sub-platform 349, item flavor 347 identifying a flavor of the item purchased, and user ID 334 for the user making the corresponding purchase.

Database 116 may further store catalog data 370, which may identify one or more attributes of a plurality of items, such as a portion of or all items a retailer carries. Catalog data 370 may identify, for each of the plurality of items, an item ID 371 (e.g., an SKU number), item brand 372, item type 373 (e.g., grocery item such as milk, clothing item), item description 374 (e.g., a description of the product including product features, such as ingredients, benefits, use or consumption instructions, or any other suitable description), item options 375 (e.g., item colors, sizes, flavors, etc.), item price 376 (e.g., the retail price of the item), and item shelf 377 (e.g., shelf location of the item in a hierarchical tree structure within different product types).

Database 116 may also store personas 330, which may identify and categorize each available or potential persona associated with the retailer. Personas 330 may include data related to available personas and corresponding product categories 330A associated with the personas. Each persona may include a plurality of product categories 330A. Each product category 330A may include a plurality of items in catalog data 370. In some examples, persons 330 may include interest-based personas (e.g., auto enthusiast, male beauty, female beauty, cooking, baking, DIY home, male fashion, female fashion, kids fashion, home, interior home, team sports enthusiast, technology, video gamer, etc.), lifestyle-based personas (e.g., healthy living, exercise enthusiast, etc.), need-based personas (e.g., food and beverages, essentials, online grocery, nursery, engagement, super engagement, etc.), and family-based personas (e.g., new parents for ages 0-1, new parents for ages 1-2, new parents for ages 2-4, new parents of a boy, new parents of a girl, busy families for ages 4-7, busy families for ages 7-13, busy families with a boy, busy families with a girl, cat owner, dog owner, pet owner, etc.).

Additionally, database 116 may store co-purchase data 350, which may identify and categorize items historically bought together by customers of the retailer. Each item of catalog data 370 may be associated one or more other items that have been historically purchased at the same time or around the same time across all customers of the retailer. In some examples, co-purchase data 350 may include embeddings generated based on user purchase data and user session data across all customer of the retailer across all platforms of the retailers as stored in database 116.

Database 116 may also store persona model data 390 identifying and characterizing one or more machine learning models. For example, persona model data 390 may include the user-persona model 392, a user-platform model 394, a combination model 396 and an aggregation model 398. Each of the user-persona model 392, user-platform model 394, combination model 396 and aggregation model 398 may be one or more machine learning models trained based on corresponding tensors (e.g., embedding vectors, feature vectors) generated by persona prediction computing device 102.

In some examples, persona prediction computing device 102 receives (e.g., in real-time) user session data 320 for a customer interacting with a website hosted by web server 104. In response, persona prediction computing device 102 generates user personas 312 identifying user personas to advertise to the customer, and transmits user personas 312 to web server 104. In other examples, persona prediction computing device 102 receives a persona request 310 from the web server 104 from a customer interacting with a website hosted by web server 104. In response, persona prediction computing device 102 generates user personas 312 identifying personas for the customer for a corresponding platform to advertise to the customer, and transmits user personas 312 to web server 104.

For example, persona prediction computing device 102 may assign each of the user-persona model 392, user-platform model 394, combination model 396 and aggregation model 398 (or parts thereof) to a different processing unit or virtual machines hosted by one or more processing devices 120. Moreover, persona prediction computing device 102 may generate tensors based at least on the received user session data 320 (e.g., the user session data 320 received in real-time) for the customer, the user transaction data 340 (e.g., the user transaction data 340 from prior or historical user sessions), item engagement data 360 (e.g., user session data 320 from prior or historical user sessions), co-purchase data 350, personas 330 and catalog data 370 as required by each of the user-persona model 392, user-platform model 394, combination model 396 and aggregation model 398. In some examples, persona prediction computing device 102 generates the tensors based on the received user session data 320, and one or more of the following: historical user session data 320 for the customer, historical user transaction data 340 for the customer, co-purchase 350, catalog data 370 and personas 330, for each of the user-persona model 392, user-platform model 394, combination model 396 and aggregation model 398. Persona prediction computing device 102 may provide (e.g., transmit) the tensors to the processing units accordingly, and the processing units may execute the models based on the provided tensors (e.g., inferencing).

Further, persona prediction computing device 102 may obtain the output (e.g., output data, output tensors) of each of the user-persona model 392, user-platform model 394, combination model 396 and aggregation model 398 from the processing units, and generate the user personas 312 based on the outputs of the models. For example, persona prediction computing device 102 may use aggregation model 398 to manipulate the output of the user-persona model 392, user-platform model 394, and combination model 396 to aggregate the user-persona scores (output of user-persona model 392), user-platform scores (output of user-platform model 394), and user-persona-platform scores (output of combination model 396) for each persona and platform pair for a customer to generate the final scores for each potential persona for the customer. Aggregation model 398 may determine the user personas 312 based on the aggregated scores for the platform and persona pairs for the customer. The aggregation model 398 may determine final personas for a platform(s) to present to the user as user personas 312 based on a combination of the model outputs. The user personas 312 may then be generated as the combination of the model outputs. In some examples, user personas 312 may be sent to other processing units for further processing to determine item recommendations to present to the customer on the corresponding platform(s) based at least in part on the user personas 312.

Figure 4:
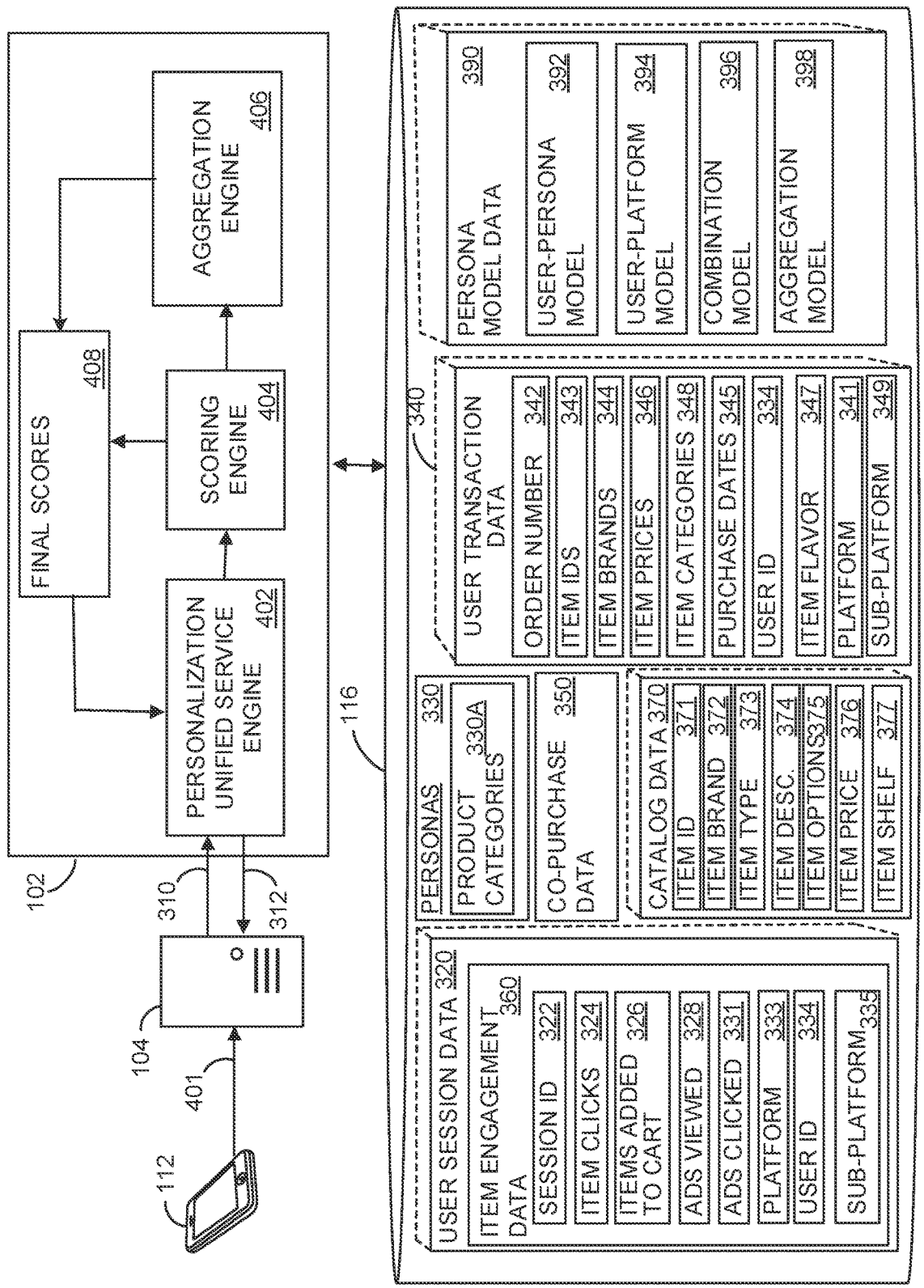
FIG. 4 is a block diagram illustrating various portions of the persona prediction computing device of FIG. 1 in accordance with some embodiments.

FIG. 4 is a block diagram illustrating a more detailed view of persona prediction computing device 102. Specifically, persona prediction computing device 102 includes personalization unified service engine 402, scoring engine 404, and aggregation engine 406. In some examples, one or more of personalization unified service engine 402, scoring engine 404, and aggregation engine 406 are implemented in hardware. In some examples, one or more of personalization unified service engine 402, scoring engine 404, and aggregation engine 406 are implemented as an executable program maintained in a tangible, non-transitory memory, such as instruction memory 207 of FIG. 2, which may be executed by one or processors, such as processor 201 of FIG. 2. For example, personalization unified service engine 402 may obtain from database 116 persona request 310 as a message 401 from user device 112 via web server 104 and may execute persona model(s) included in the persona model data 390.

In this example, web server 104 transmits a persona request 310 to persona prediction computing device 102. Persona request 310 may include a request for user personas for a retailer platform(s) for presentation of user personas and/or user persona derived item recommendations to a particular user using the user device 112. In some examples, persona request 310 further identifies a user (e.g., customer) for whom the user personas are requested at web server 104. Personalization unified service engine 402 receives persona request 310, and receives and parses the user session data 320 (e.g., user session data associated with a current user session of the user in real-time). Personalization unified service engine 402 provides the user session data to the scoring engine 404, and aggregation engine 406, and other data, which may include the user transaction data 340, user session data 320 (e.g., user session data from historical user sessions), personas 330, co-purchase data 350, and catalog data 370 extracted from database 116.

Scoring engine 404 can determine one or more potential personas for the corresponding platform(s) for the user and their corresponding user-persona scores, user-platform scores, and/or user-persona-platform scores based on the user session data 320, the user transaction data 340, personas 330, co-purchase data 350, and/or catalog data 370. Scoring engine 404 may use user-persona model 392, user-platform model 394, and combination model 398 to determine the potential personas and corresponding scores for the corresponding platform(s) for the user based on the user's historical purchase and/or session data for the particular user of user device 112, other users' historical purchase and/or session data, catalog data 370, personas 330, and co-purchase data 350 extracted from the database 116. In some examples, scoring engine 404 may further use a plurality of scoring algorithms and/or machine learning models to determine the user-persona scores, user-platform scores, and/or user-persona-platform scores for each potential persona and the corresponding platform personalized to the user. Scoring engine 404 generates ranked (e.g., scored) combinations of user personas and platform(s) for the user, identifying and characterizing user personas determined to be relevant to the user and including scores for each persona and platform pair while retaining the relevancy of the personas for the user. Scoring engine 404 may provide the potential combinations (e.g., with corresponding user-persona scores, user-platform scores, and/or user-persona-platform scores) to aggregation engine 406.

Aggregation engine 406 can determine final personas 408 and their aggregated scores for the platform(s) based on an overall relevancy of the persona to the user. Aggregation engine 406 may use the aggregation model 398 to aggregate the user-persona scores, user-platform scores, and/or user-persona-platform scores for each combination of persona and platform(s) for the user to generate a ranked list of user personas 312 for the platform(s) for the user, the user persona(s) ranked for the platform(s) based on the aggregated scores for the persona and platform combination. Aggregation engine 406 may determine the optimal personas for the platform(s) and/or sub-platform(s) to be recommended to the user. Final personas 408 may be generated by aggregation engine 406 for user personas 312. The final personas 406 may be the highest ranked personas for the platform(s) for the user to be either presented to the user as a part of the user's profile or presented in combination with corresponding item recommendations determined based on the final personas 408 as determined by the aggregation engine 406 to provide maximal relevancy personas and/or item recommendations to the user on the platform(s).

Final personas 408 can determine an ordered list of the user personas 312 based on the final scored combinations of personas and platform(s) received from the aggregation engine 406. Final personas 408 may generate data that identifies the order and/or positions of user personas 312 associated with the particular user (e.g., customer) and the particular platform(s) to optimize user interactions with and user purchases of items recommended based at least in part on the user personas within the particular platform(s).

Personalization unified service engine 402 may receive the user personas 312 from the final personas 408 in a data format (e.g., message) acceptable by web server 104. Personalization unified service engine 402 transmits the user personas 312 to web server 104. Web server 104 may then update or generate user personas and/or item recommendations based on the user personas for presentation to the user via the user device 112 based on the final personas 408.

Figure 5:
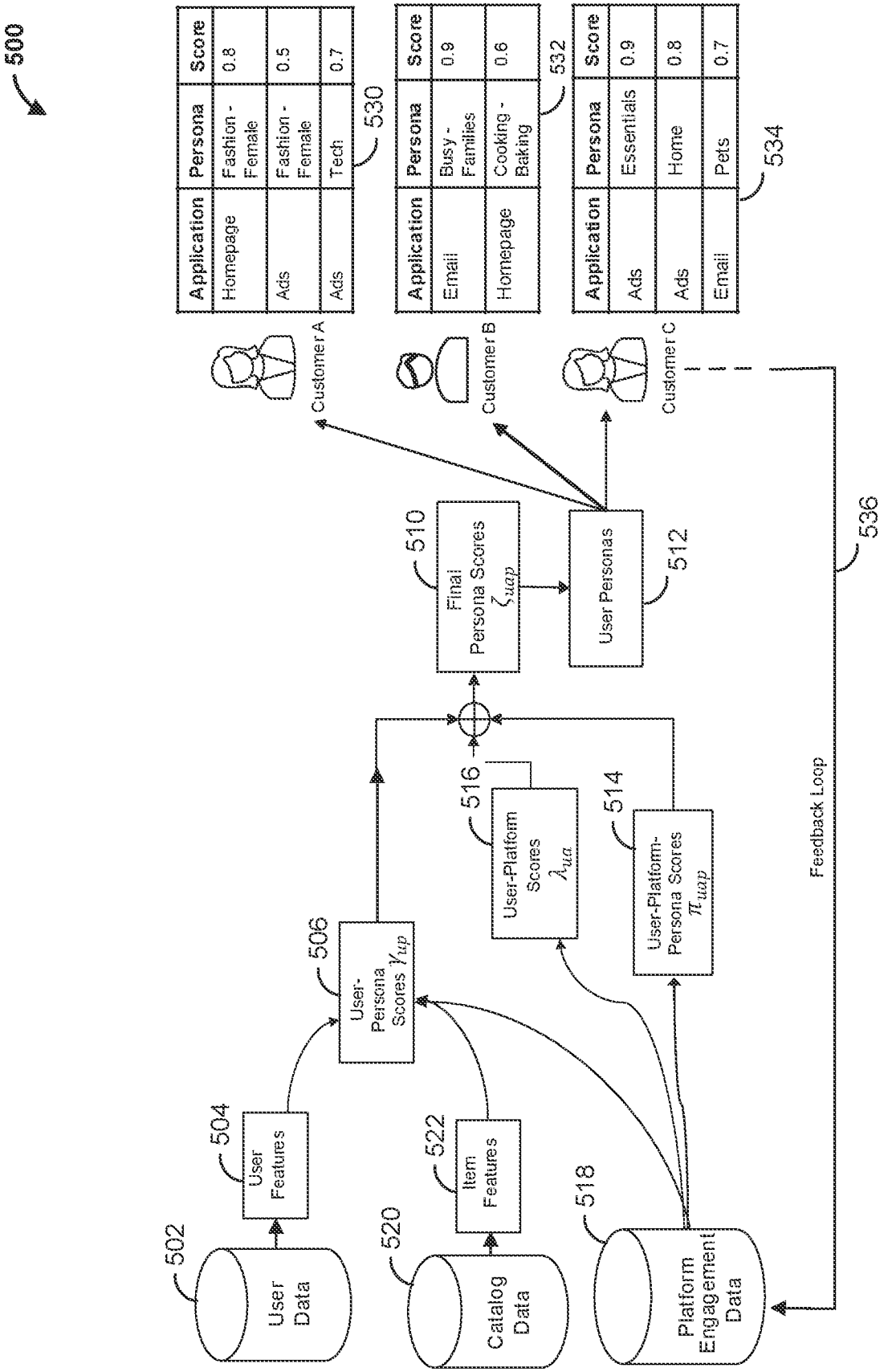
FIG. 5 is a flowchart of an example method that can be carried out by the persona prediction computing device of FIG. 1 in accordance with some embodiments.

FIG. 5 is a flowchart of an example method 500 that can be carried out by the persona system 100 of FIG. 1. User features 504 are extracted from user data 502. For example, persona prediction computing device 102 may receive or obtain user session data 320, and/or user transaction data 340 associated with the user and/or other users from database 116. Persona prediction computing device may extract user engagement data for the customer from user data, including, but not limited to, historical transactions, add to carts, item views, searches, clicks, impressions, and browsing data. In some examples, persona prediction computing device 102 may also extract co-purchase data for items purchased together by customers across all customers of the retailer from the user data associated with all customers and/or catalog data.

Item features 522 are extracted from catalog data 520. For example, persona prediction computing device 102 may receive or obtain catalog data 370 from database 116. Persona prediction computing device may extract item features such as, but not limited to, title, description, brand, and product type (e.g., category), for each item from the catalog data 370. Further, platform engagement data 518 may be obtained or received from database 116. In some examples, persona prediction computing device 102 may extract user-platform engagement data, such as, but not limited to, add to carts clicks, impressions, transaction, from historical user data for each retailer platform. In some example, persona prediction computing device 102 may also extract user-persona engagement data across platforms, such as, but not limited to, add to cards, clicks, impressions, transaction, from historical user data.

Next, user-persona scores 506 are generated for the user based on the user features 504, platform engagement data 518, and item features 522. For example, persona prediction computing device 102 may determine user-persona scores for each of the personas 330 for the user using the user-persona model 392 based on the item features, user features, and user-persona engagement data extracted from user session data 320, user transaction data 340, catalog data 370, and/or co-purchase data 350.

User-platform scores 516 are generated for the user based on the platform engagement data 518. For example, persona prediction computing device 102 may determine user-platform scores for the corresponding platform(s) for the user using the user-platform model 394 based on the user-persona engagement data extracted from user session data 320, and user transaction data 340.

Additionally, user-platform-persona scores 514 are generated based on the platform engagement data 518. For example, persona prediction computing device 102 may determine user-platform scores for the corresponding platform(s) for the user using the combination model 396 based on the user-persona engagement data extracted from user session data 320, and user transaction data 340 corresponding to user interactions with items associated with particular personas on the corresponding platform(s) and/or sub-platform(s).

The user-persona scores 506 user-platform scores 516, and the user-platform-persona scores 514 may be aggregated to generate final persona scores 510 for the platform(s) for the particular user. For example, persona prediction computing device 102 may use aggregation model 398 to determine final scores for the personas and corresponding platform(s) based on $_o$aggregating the user-persona scores, user-platform scores, and the user-platform-persona scores for each of the personas and platform combination for the user.

User personas 512 are then selected and/or validated for each platform based on the final persona scores 510 for the persona and platform combinations for the user. For example, user personas 312 may be selected for the user based on the final persona scores 510 for each persona and platform combination. For example, user personas 530, 532 and 534 are generated as examples for customer A, customer B, and customer C. Persona 530 illustrates example personas determined for customer A for platforms "Homepage" and "Ads." For example, persona prediction computing device 102 may determine that the user persona to be used for customer A for platform "Homepage" is "Fashion-Female" based on the highest final score of "0.8" as calculated for the homepage and fashion-female combination for customer A. Similarly, persona prediction computing device 102 may determine that the user personas to be used for customer A for platform "Ads" is "Tech" and "Fashion-Female" based on the highest respective final scores of "0.7" and "0.5" as calculated for the ads and tech, and ads and fashion-female combinations for customer A. Further, based on the described method 500, persona prediction computing device 102 may determine, for customer B, the user persona of "Busy-Families" for platform "Email," and user persona of "Cooking-Baking" for platform "Homepage" based on the respective final scores of "0.9" and "0.6" for the two combinations of user persona and platform. As can be seen, based on the described method 500, persona prediction computing device 102 may determine, for customer C, the user personas of "Essentials" and "Home" for platform "Ads," and user persona of "Pets" for platform "Email" based on the respective final scores of "0.9," "0.8" and "0.7" for the three combinations of user persona and platform. It should be understood that the example user personas for the customer A, customer B, and customer C are provided for illustration purposes only, and any other combination is possible.

Further, selected user personas for each of customer A, customer B, and customer C may be presented to the corresponding customer on the corresponding platform as determined. User data 502 and/or platform engagement data 518 for a customer may be updated based on feedback loop 536 when new user interactions and/or transactions are received from any of the customers (e.g., customer A, customer B, customer C). The new user interactions and/or transactions may be associated with the corresponding user personas (e.g., user personas 530, 532 or 534) for the customer (e.g., customer A, customer B or customer C) within the corresponding platform. The updated user data 502 and/or updated platform engagement data 518 may be used to update the corresponding user-persona scores 506, user-platform scores 516, and user-platform-persona scores 514 for the corresponding customer. Similarly, final persona scores 510 and corresponding user personas 512 may be updated for the corresponding customer (e.g., customer A, customer B, customer C). As such, user personas 512 may be updated for customers as new data is received from the customers. In some examples, the user personas 512 may be updated in real-time or near real-time as the new data is received from a corresponding customer. In other examples, the user personas 512 may be updated at set temporal intervals for each customer.

Figure 6:
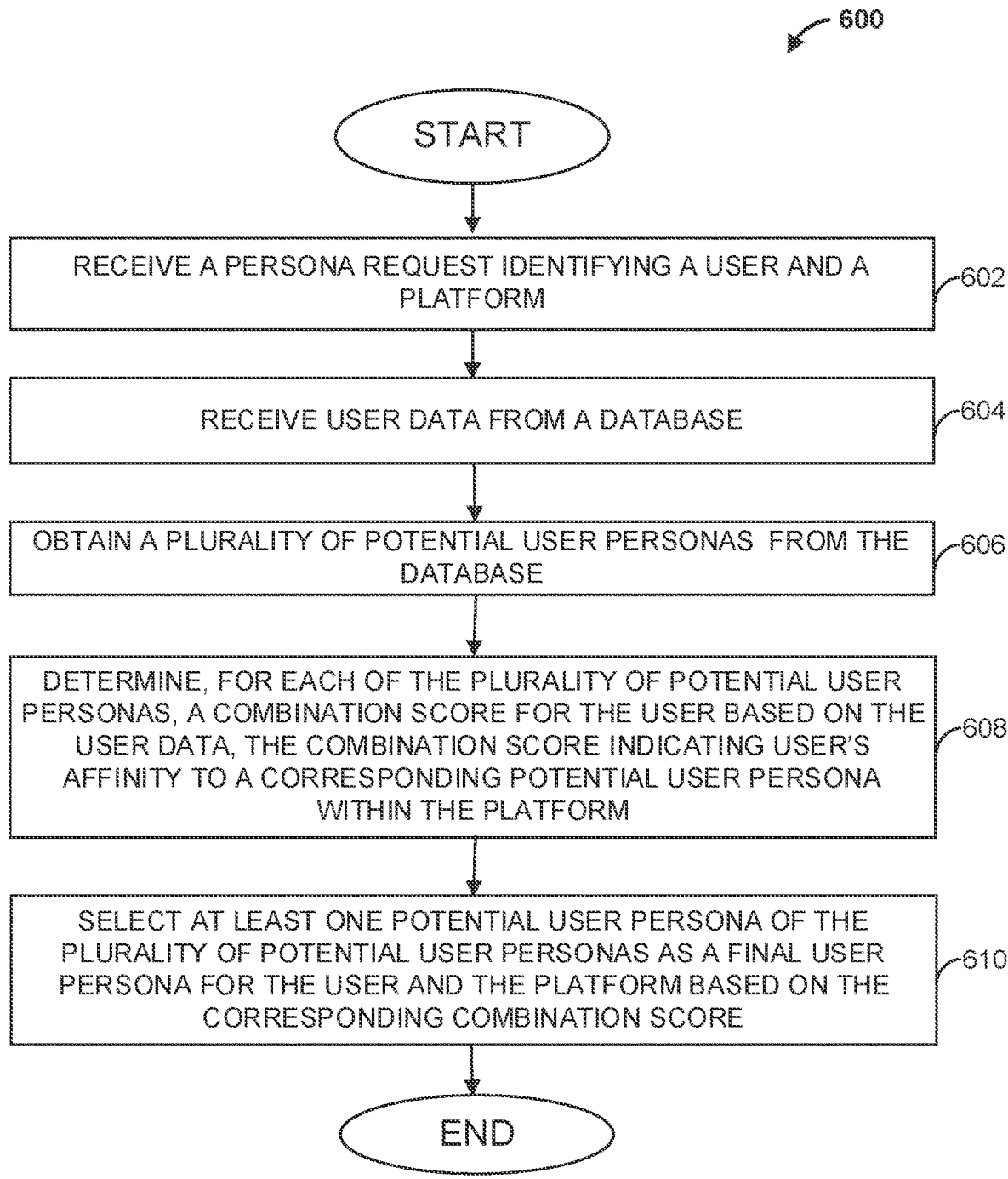
FIG. 6 is a flowchart of another example method that can be carried out by the persona prediction computing device of FIG. 1 in accordance with some embodiments.

FIG. 6 is a flowchart of an example method 600 that can be carried out by the persona system 100 of FIG. 1. At step 602, a computing device, such as persona prediction computing device 102, receives a persona request identifying a user and a platform (e.g., application). For example, persona prediction computing device 102 may receive a persona request 310 from web server 104 identifying a user and a platform. At step 604, user data is received from a database. For example, persona prediction computing device 102 may obtain the user session data and/or user transaction data for the user from database 116, which stores user session data 320 and user transaction data 340 for a plurality of users.

Proceeding to step 606, a plurality of potential user personas are obtained from the database. For example, persona prediction computing device 102 may obtain personas 330 from database 116. At step 608, for each of the plurality of potential user personas, a combination score is determined for the user based on the user data, the combination score indicating user's affinity to a corresponding potential user persona within the platform. For example, persona prediction computing device 102 may determine final personas 408 based on the final aggregated scores generated by aggregation engine 406 for each persona 330 and platform pair (e.g., combination) based on the user session data 320 and user transaction data 340. The final scores may indicate the user's affinity to a user persona within a platform (e.g., likelihood or probability of the user interacting with items and/or item categories associated with the user persona within the platform).

At step 610, at least one potential user persona of the plurality of potential user personas is selected as a final user persona for the user and the platform based on the corresponding combination score. For example, persona prediction computing device 102 may select user personas 312 for the user and the platform based on the final scores for the potential user personas and platform combinations. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
   a database configured to:
   store historical user data representative of one or more prior interactions between one or more users and one or more platforms; and
   store item data representative of one or more items each having one or more associated features in the database;
   a first processor configured to:
   receive a persona request identifying a first user and a first platform;
   receive user session data representative of interactions between the first user and the first platform occurring during a concurrent session;
   obtain the historical user data associated with the one or more users and the one or more platforms from the database;

obtain a plurality of potential user personas from the database, each of the plurality of potential user personas including data characterizing a particular product category of a plurality of product categories;
generate one or more embeddings based on the user session data, the historical user data, and the plurality of potential user personas;
train a first model to generate a platform-specific sub-score, wherein the first model is trained using at least the one or more embeddings generated based on the historical user data;
train a second model to generate a user-specific sub-score, wherein the second model is trained using at least the one or more embeddings generated based on the historical user data and the plurality of potential user personas;
for each of the plurality of potential user personas, determine a combination score for the user based on at least the user session data and each of the plurality of potential user personas, the combination score indicates affinity to a corresponding potential user persona for the first platform, wherein the combination score is generated by aggregating outputs of the first and second models;
select at least one potential user persona of the plurality of potential user personas as a final user persona for the user and the platform based on the a corresponding combination score; and
transmit, over one or more networks, the final user persona to a second processor configured to (i) generate item recommendation data identifying and characterizing one or more item recommendations based on the final user persona and (ii) transmit, over the one or more networks and to a second computing device, instructions configured to cause the second computing device to generate an interface including the one or more item recommendations;
receive additional session data representative of one or more additional interactions between the first user and the first platform in response to generation of the interface;
generate one or more updated embeddings representative of the additional session data; and
retrain at least one of the first model or the second model based on the one or more embeddings and the one or more updated embeddings.

2. The system of claim 1, wherein the second model includes a user-persona model configured to determine, for each of the plurality of potential user personas, a user-persona score for the user indicating a likelihood of the user interacting with the corresponding potential user persona, and wherein the user-persona model is configured to receive one or more embeddings representative of user-persona engagement data, user engagement data, and catalog data.

3. The system of claim 1, wherein the first model includes a user-platform model configured to determine a user-platform score for the user indicating a likelihood of the user interacting with the platform, and wherein the user platform model is configured to receive one or more embeddings representative of a user, a platform, and a persona.

4. The system of claim 1, wherein at least one of the first model or the second model includes a user-persona-platform model configured to determine, for each of the plurality of potential user personas, a user-persona-platform score for the user indicating a likelihood of the user interacting with the items associated with the corresponding potential user persona within the platform, and wherein the user-persona-platform model is configured to aggregate sub-platform embeddings belonging to a corresponding potential user persona.

5. The system of claim 1, wherein the plurality of potential user personas is one or more of internet-based personas, lifestyle-based personas, need-based personas, and family-based personas.

6. The system of claim 1, wherein determining the combination score is further based on catalog data including a plurality of items for sale on the platform.

7. A computer-implemented method comprising:
receiving, by a processor, a persona request identifying a first user and a first platform;
receiving, by the processor, user session data representative of interactions between the first user and the first platform occurring during a concurrent session;
obtaining, by the processor, historical user data associated with the user from a database, the user data including user session data identifying and characterizing interactions between the user and the platform and user transaction data identifying and characterizing one or more transactions of the user;
obtaining, by the processor, a plurality of potential user personas from the database, each of the plurality of potential user personas including data characterizing a particular product category of a plurality of product categories;
generating one or more embeddings based on the user session data, the historical user data, and the plurality of potential user personas;
training a first model to generate a platform-specific sub-score, wherein the first model is trained using at least the one or more embeddings generated based on the historical user data;
training a second model to generate a user-specific sub-score, wherein the second model is trained using at least the one or more embeddings generated based on the historical user data and the plurality of potential user personas;
for each of the plurality of potential user personas, determining, by the processor, a combination score for the user based on at least the user session data and each of the plurality of potential user personas, the combination score indicates affinity to a corresponding potential user persona for the first platform, wherein the combination score is generated by aggregating outputs of the first and second models;
selecting, by the processor, at least one potential user persona of the plurality of potential user personas as a final user persona for the user and the platform based on the a corresponding combination score; and
transmitting, by the processor and over one or more networks, the final user persona to a computing system configured to (i) generate item recommendation data identifying and characterizing one or more item recommendations based on the final user persona and (ii) transmit, over the one or more networks and to a second computing device, instructions configured to cause the second computing device to generate an interface including the one or more item recommendations;
receiving additional session data representative of one or more additional interactions between the first user and the first platform in response to generation of the interface;
generating one or more updated embeddings representative of the additional session data; and retraining at least one of the first model or the second model based on the one or more embeddings and the one or more updated embeddings.

8. The computer-implemented method of claim 7, wherein the second model includes a user persona model configured to determine, for each of the plurality of potential user personas, a user-persona score for the user indicating a likelihood of the user interacting with items associated with the corresponding potential user persona, and wherein the user-persona model is configured to receive one or more embeddings representative of user-persona engagement data, user engagement data, and catalog data.

9. The computer-implemented method of claim 7, wherein the first model includes a user-platform model configured to determine a user-platform score for the user indicating a likelihood of the user interacting with the platform, and wherein the user platform model is configured to receive one or more embeddings representative of a user, a platform, and a persona.

10. The method of claim 7, wherein at least one of the first model or the second model includes a user-persona-platform model configured to determine, for each of the plurality of potential user personas, a user-persona-platform score for the user indicating a likelihood of the user interacting with the items associated with the corresponding potential user persona within the platform, and wherein the user-persona-platform model is configured to aggregate sub-platform embeddings belonging to a corresponding potential user persona.

11. The computer-implemented method of claim 7, wherein the plurality of potential user personas be one or more of internet-based personas, lifestyle-based personas, need-based personas, and family-based personas.

12. A non-transitory computer readable medium having instructions stored thereon, wherein the instructions, when executed by at least one processor, cause a device to perform operations comprising:
receiving a persona request identifying a first user and a first platform;
receiving user session data representative of interactions between the first user and the first platform occurring during a concurrent session;
obtaining historical user data associated with the user from a database, the user data including user session data identifying and characterizing interactions between the user and the platform and user transaction data identifying and characterizing one or more transactions of the user;
obtaining a plurality of potential user personas from the database, each of the plurality of potential user personas including data characterizing a particular product category of a plurality of product categories;
generating one or more embeddings based on the user session data, the historical user data, and the plurality of potential user personas;
training a first model to generate a platform-specific sub-score, wherein the first model is trained using at least the one or more embeddings generated based on the historical user data;
training a second model to generate a user-specific sub-score, wherein the second model is trained using at least the one or more embeddings generated based on the historical user data and the plurality of potential user personas;
for each of the plurality of potential user personas, determining a combination score for the user based on at least the user session data and each of the plurality of potential user personas, the combination score indicates affinity to a corresponding potential user persona for the first platform, wherein the combination score is generated by aggregating outputs of the first and second models;
selecting at least one potential user persona of the plurality of potential user personas as a final user persona for the user and the platform based on a corresponding combination score; and
transmitting, over one or more networks, the final user persona to a computing system configured to (i) generate item recommendation data identifying and characterizing one or more item recommendations based on the final user persona and (ii) transmit, over the one or more networks and to a second computing device, instructions configured to cause the second computing device to generate an interface including the one or more item recommendations;
receiving additional session data representative of one or more additional interactions between the first user and the first platform in response to generation of the interface;
generating one or more updated embeddings representative of the additional session data; and
retraining at least one of the first model or the second model based on the one or more embeddings and the one or more updated embeddings.

13. The system of claim 1, wherein generating the one or more embeddings comprises:
encoding attributes of the user session data, the historical user data, or the plurality of potential user personas using a semantic similarity model; and
embedding encoded attributes in a vector space.

14. The system of claim 1, wherein the first processor is configured to generate an updated combination score by aggregating an updated sub-score of each of the first model and the second model, wherein each of the updated sub-scores is based at least in part on the updated embeddings.

15. The system of claim 14, wherein each of the first model and the second model is implemented by a separate, distributed processor.

16. The system of claim 1, comprising the second processor, wherein the interface is populated with interface elements based on the final user persona.

17. The method of claim 7, wherein generating the one or more embeddings comprises:
encoding attributes of the user session data, the historical user data, or the plurality of potential user personas using a semantic similarity model; and
embedding encoded attributes in a vector space.

18. The method of claim 7, comprising generating, by a second processor, the interface including interface elements based on the final user persona.

19. The non-transitory computer readable medium of claim 12, wherein generating the one or more embeddings comprises:
encoding attributes of the user session data, the historical user data, or the plurality of potential user personas using a semantic similarity model; and
embedding encoded attributes in a vector space.

20. The non-transitory computer readable medium of claim 12, wherein the instructions, when executed by the at least one processor, cause the device to perform operations comprising generating the interface including interface elements based on the final user persona.

* * * * *